United States Patent
Strijkers et al.

(10) Patent No.: US 9,948,544 B2
(45) Date of Patent: Apr. 17, 2018

(54) LOCALIZING AND PLACEMENT OF NETWORK NODE FUNCTIONS IN A NETWORK

(71) Applicants: Koninklijke KPN N.V., The Hague (NL); Nederlandse Organisatie voor toegepast-natuurwetenschappelijk onderzoek TNO, 's-Gravenhage (NL)

(72) Inventors: Rudolf Strijkers, Zurich (CH); Pieter Jan Meulenhoff, Noordhorn (NL)

(73) Assignees: KONINKLIJKE KPN N.V., The Hague (NL); NEDERLANDS ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 120 days.

(21) Appl. No.: 14/777,887

(22) PCT Filed: Mar. 17, 2014

(86) PCT No.: PCT/EP2014/055234
§ 371 (c)(1),
(2) Date: Sep. 17, 2015

(87) PCT Pub. No.: WO2014/146996
PCT Pub. Date: Sep. 25, 2014

(65) Prior Publication Data
US 2016/0301598 A1  Oct. 13, 2016

(30) Foreign Application Priority Data

Mar. 18, 2013  (EP) .................................... 13159723

(51) Int. Cl.
*G06F 13/00* (2006.01)
*H04L 12/707* (2013.01)
(Continued)

(52) U.S. Cl.
CPC ............ *H04L 45/22* (2013.01); *G06F 9/5072* (2013.01); *H04L 12/66* (2013.01); *H04L 67/10* (2013.01);
(Continued)

(58) Field of Classification Search
CPC ......... H04L 67/34; H04L 67/10; H04L 67/32; H04L 67/42; H04L 45/22; H04L 67/327; H04L 12/66; H04L 45/64; G06F 9/5072
(Continued)

(56) References Cited

U.S. PATENT DOCUMENTS 8,244,874 B1 * 8/2012 Thireault ............... G06F 9/5055
709/226
2006/0031562 A1  2/2006 Satomi
(Continued)

FOREIGN PATENT DOCUMENTS

GB  2477092 A  7/2011
JP  2012-174001  9/2012
(Continued)

OTHER PUBLICATIONS

Satyanarayanan, M., et al., "The Case for VM-Based Cloudlets in Mobile Computing," *IEEE Pervasive Computing*, vol. 8, No. 4, pp. 14-23, Oct. 1, 2009.
(Continued)

*Primary Examiner* — Kenneth R Coulter
(74) *Attorney, Agent, or Firm* — Hamilton, Brook, Smith & Reynolds, P.C.

(57) ABSTRACT

The invention enables placement and use of a network node function in a second network node instead of using the network node function in a first network node. The network node function is e.g. a server function or a router function. The second network node is typically located in or close to the client device or to the network of an operator servicing
(Continued)

a client device to enable optimization of client-server communication and optimization of the load on the client-server communication in the network. Client requests transmitted to the first network node may be redirected to the second network node.

18 Claims, 5 Drawing Sheets

(51) Int. Cl.
  *H04L 29/08* (2006.01)
  *G06F 9/50* (2006.01)
  *H04L 12/66* (2006.01)
  *H04L 29/06* (2006.01)
  *H04L 12/715* (2013.01)
(52) U.S. Cl.
  CPC ............ *H04L 67/32* (2013.01); *H04L 67/327* (2013.01); *H04L 67/34* (2013.01); *H04L 67/42* (2013.01); *H04L 45/64* (2013.01)
(58) Field of Classification Search
  USPC .................. 709/229, 227, 228, 220, 221
  See application file for complete search history.

(56) References Cited

U.S. PATENT DOCUMENTS

| | | |
|---|---|---|
| 2010/0169477 A1 | 7/2010 | Stienhans et al. |
| 2012/0173686 A1 | 7/2012 | Doyle et al. |
| 2015/0381766 A1* | 12/2015 | Yoshida ................ G06F 9/4856 709/222 |

FOREIGN PATENT DOCUMENTS

| | | |
|---|---|---|
| JP | 2012-247865 | 12/2012 |
| WO | WO 02/095605 A1 | 11/2002 |
| WO | WO 2012/132808 | 4/2012 |

OTHER PUBLICATIONS

Notification of Transmittal of the International Search Report and the Written Opinion of the International Searching Authority, PCT/EP2014/055234, dated May 15, 2014.

\* cited by examiner

LOCALIZING AND PLACEMENT OF NETWORK NODE FUNCTIONS IN A NETWORK

This application is the U.S. National Stage of International Application No. PCT/EP2014/055234, filed Mar. 17, 2014, which designates the U.S., published in English, and claims priority under 35 U.S.C. § § 119 or 365(c) to European Application No. 13159723.9, filed Mar. 18, 2013.

FIELD OF THE INVENTION

The present invention relates to localization and placement of network node functions in networks. More specifically the invention relates to a method for enabling a network node function on a second network node and a resource provider entity for enabling a network node function on a second network node.

BACKGROUND

It is known that network overhead can impact the end-to-end performance of client-server applications. The impact of network overhead may be increased when the number of networks, the number of network elements and/or the geographical distance between clients and servers increases. For example, network delay caused by the distance between a client and a server can significantly reduce the client's quality of experience when a single user request requires multiple calls to databases, application servers and/or the client.

Network-related performance degradation in client-server communication can be reduced by explicitly managing network traffic. Hereto network operators can e.g. assign paths to specific end-points (e.g. using MPLS, VPNs or Fiber-optic circuits) or allow applications to express a quality of service requirement (e.g. using DiffServ or IntServ), which can be used to prioritize application traffic. More recently, Software Defined Networks enable network operators more fine-grained control over data flows using a centralized control plane, e.g. by rerouting data flows to avoid bottlenecks.

Though known network management solutions can avoid bottlenecks or prioritize traffic, they cannot change the end-points, i.e. the location of the client and server. As a result, potential dimensioning problems in the network cannot be solved and a reduction of network resources (e.g. minimizing the number of hops, optimizing bandwidth or explicit control of network resources) cannot be achieved. The effect of this is that if many demanding client-server applications request the use of a low-capacity network element, there is no network management solution to improve the perceived quality of the network other than denying or rate limiting the service.

Network service providers are known that specialize in the control, operation, and maintenance of networks that enable use of cloud services. Such network service providers typically do not provide cloud service providers the capability to control how their cloud services are accessed. Furthermore, cloud service providers typically do not allow the network service provider to optimize cloud service delivery that takes network service delivery into account. This leads to the situation that both the network service provider and cloud service provider are unable to arrange the network and other fundamental computing resources in a way that provides optimal services to the end-user with optimal resource usage.

Recent developments in the 3GPP standard for mobile communication relate to Long Term Evolution (LTE) networks and devices. LTE, also known as 4G (i.e. fourth generation) mobile communications standard, is a standard for wireless communication of high-speed data for mobile phones and data terminals. It is a successor of GSM/EDGE (also known as 2G or 2.5G) and UMTS/HSPA (also known as 3G) network technologies, increasing the capacity and speed using a different radio interface together with core network improvements.

The above identified problem of not being able to provide optimal services to the end-user with optimal resource usage can also be applied to LTE networks. The design of LTE networks does not include management and coordination of computing or storage resources in combination with network resources.

Client devices typically attach to an Internet gateway by requesting a connection to an Access Point Name (APN), which leads to a tunnel to a Public Data Network (PDN) gateway that provides the actual IP services such as addressing and Internet gateway functionality. Alternatively, a (home) router or H(e)NodeB (i.e. LTE base station) in the network service provider's network can function as Internet gateway. Depending on the location in the network service provider's network, traffic over the Internet gateway is routed over the backhaul (i.e. the network connecting the base station or (home) router to the core network) to its core network before being routed to the Internet.

In known 3GPP proposals the H(e)NodeB's can be configured to redirect data traffic to local devices through a local area network or to redirect traffic through the network of another Internet service provider. An example of such proposal can be found in 3GPP specification TR 23.829 Release 10 entitled "Local IP Access and Selected IP Traffic Offload (LIPA/SIPTO)". The goal of LIPA/SIPTO is to avoid congestion in the backhaul or core network by redirecting traffic over an available fixed broadband network, and to support IP communication with local devices, such as a home printer or media center. A client device is connected to the access network through an H(e)NodeB, (Home) router or PDN-gateway as the Internet gateway, which supports packet filtering and redirection of traffic through network address translation.

With cloud computing a client device uses a cloud service at a cloud service provider. A cloud service is a service that is delivered and consumed on demand at any time, through any access network, using any connected devices using cloud computing technologies. A cloud service user (CSU) is a person or organization that consumes delivered cloud services, typically using a client device. A CSU can include intermediate users that will deliver cloud services provided by a cloud service provider (CSP) to actual users of the cloud service, i.e. end users. End users can be persons, machines, or applications. Cloud computing is a model for enabling service users to have on-demand network access to a shared pool of configurable computing resources (e.g. networks, servers, storage, applications and services), that can typically be provisioned and released with minimal management effort or service-provider interaction. Cloud computing enables the cloud services. It is considered from a telecommunication perspective that users are not buying physical resources but cloud services that are enabled by cloud computing environments. Cloud infrastructure as a service (IaaS) is a category of cloud services where the capability provided by the cloud service provider to the cloud service user is to provision virtual processing, storage, intra-cloud network connectivity services (e.g. VLAN, firewall, load balancer and application acceleration), and other fundamental computing resources of the cloud infrastructure where the cloud service user is able to deploy and run arbitrary application. Inter-cloud computing allows on-demand assignment of cloud resources, including computing, storage and network, and the transfer of workload through interworking of cloud systems. From the viewpoint of a CSP, inter-cloud computing can be implemented in different manners, including inter-cloud peering, inter-cloud service broker and inter-cloud federation. These manners correspond to distinct possible roles that a CSP can play when interacting with other CSPs. Inter-cloud peering provides direct inter-connection between two CSPs. An inter-cloud service broker (ISB) provides indirect interconnection between two (or more) CSPs achieved through an interconnecting CSP which, in addition to providing interworking service functions between the interconnected CSPs, also provides brokering service functions for one (or more) of the interconnected CSPs. ISB also covers the case in which one (or more) of the interconnected entities receiving the brokering service is a cloud service user (CSU). Brokering service functions generally includes but is not limited to, the following three categories: service intermediation, service aggregation and service arbitrage. Inter-cloud federation is a manner to implement inter-cloud computing in which mutually trusted clouds logically join together by integrating their resources. Inter-cloud federation allows a CSP to dynamically outsource resources to other CSPs in response to demand variations.

A mobile cloud is a model in which mobile applications (i.e. application for mobile devices) are built, powered and hosted using cloud computing technology. The client device may acts as the on-device gateway, which enables the user to access the information stored and processed within the cloud. Mobile cloud applications can send processing or storage tasks to servers located in a cloud, receive, and display the results and uses cloud resources to store data or to execute functions normally performed by the client device (e.g. pre-process web pages for optimal display on a mobile device, transcoding, storing application data). Mobile cloud applications can be downloaded on the client device or directly accessed via the web browser (e.g. using HTML5 and Javascript) and make use of client device capabilities and sensors, such as camera's, GPS, or microphone to deliver a service.

The mobile cloud application provider typically cannot control the network between the cloud server and the client device, though communication between client devices and cloud servers requires broadband connectivity. Moreover, streaming media or gaming applications may require network connectivity within certain latency and jitter bounds. With the increasing need for faster networks to support new and more demanding applications, network service providers typically increase network capacity to meet demands. Other options, such as prioritizing traffic require advanced network management and only improve the quality of service within the network service provider's boundaries. But congestion, delay, errors, and failures outside the network service provider's boundaries may still negatively impact application performance.

Intercloud computing enables end-users to create and transfer servers over a multitude of Cloud Service Providers (CSP). This ability allows end-users to implement three functions: load balancing, cloud bursting and fail-over. In a load balancing setup, servers are copied over multiple cloud server providers. A proxy server distributes client requests over the servers. Cloud bursting enables a server to distribute workload over multiple cloud service providers if local resources are insufficient to handle the workload. Load balancing can be used to distribute client requests, but the servers may also handle part of the workload to process client requests. End-users can also implement fail-over mechanisms when servers can be distributed over multiple resource providers.

An Intercloud service broker adds the capability to intermediate, aggregate and arbitrate between cloud service providers. Depending on application requirements (e.g. location, pricing, resources) the Intercloud service broker provides functionality to match cloud resource buyers (e.g. end-users, cloud service provider or reseller) to cloud resource sellers (e.g. cloud service provider or reseller). The goal is to provide the best possible match between offered and required resources to run a server and to abstract individual cloud service providers into a single entry-point for cloud services. An Intercloud service broker is required to provide end-users the capability for implementing load balancing, cloud bursting, and fail-over in the Intercloud.

Cloud service brokers can be used to match server requirements (e.g. price, CPU, memory, location) to cloud locations. Cloud service brokers have no notion of the network between clients and servers and do not model network context specific details of client devices either. Therefore, cloud service brokers do not significantly reduce the overhead of induced by traversing the network service provider's network(s), which negatively impacts client-server communication (e.g. network latency, propagation delay, buffering/queuing in network devices, errors, failures).

The current 3GPP proposals on LIPA/SIPTO provide no solution to optimize client-server communication, because it provides no mechanism to minimize or avoid the overhead of the network. Consequently, allocating servers on cloud locations in the Internet using e.g. an Inter-cloud service broker does not lead to significant benefits to clients or a reduction of traffic at the network service provider.

There is need for a solution in which server functions can be placed in such a way that desirable operational parameters of the network can be achieved with relation to client devices.

SUMMARY OF THE INVENTION

It is an object of the invention to provide for a solution in which network node functions can be placed in such a way that desirable operational parameters of the network can be achieved with relation to client devices.

According to an aspect of the invention a method is proposed for enabling a network node function on a second network node. The network node function can be provided to a client device that is communicatively connected to a first network node. The method can comprise receiving a request data from the client device in the first network node for requesting the network node function. The request data can comprise a client identification data and an indication of the network node function in the first network node. The method can further comprise determining in the first network node a resource provider entity based on the client identification data. The method can further comprise transmitting a resource allocation request from the first network node to the resource provider entity. The resource allocation request can comprise the client identification data and the indication of the network node function. The method can further comprise obtaining a client context data in the resource provider entity based on the resource allocation request. The method can further comprise determining in the resource provider entity the second network node based on the client context data. The method can further comprise transmitting a function placement request from the resource provider entity to the second network node. The function placement request can comprise the indication of the network node function. The method can further comprise enabling the network node function in the second network node based on the function placement request.

According to an aspect of the invention a resource provider entity is proposed for enabling a network node function on a second network node. The network node function can be accessible by a client device that is communicatively connected to the first network node. The resource provider entity can be configured to receive a resource allocation request from the first network node. The resource allocation request can comprise a client identification data and an indication of the network node function in the first network node. The resource provider entity can be configured to obtain client context data based on the resource allocation request. The resource provider entity can be configured to determine the second network node based on the client context data. The resource provider entity can be configured to transmit a function placement request to the second network node for enabling the network node function in the second network node based on the function placement request. The function placement request can comprise the indication of the network node function.

The invention thus enables placement and use of a network node function in a second network node instead of using the network node function in a first network node. The location of the second network node is such that communication between the client device or the network of an operator servicing the client device and the second network node is more optimal than the first network node in terms of quality of experience of the service requested by the client device and possibly the network load related to the client-server communication. Client requests transmitted to the first network node may be redirected to the second network node.

The client device may be any end-user device or a network node other than the first network node and the second network node.

Examples of network nodes are servers, routers, and switches. Examples of network node functions are (parts of) application or network services. Application services are e.g. a web server, a HTTP proxy, database, web service (e.g. REST, SOAP), data stores, or content cache (e.g. CDN service). Examples of network services are Internet Gateways, DHCP servers, firewalls, network element functions (e.g. HSS, MME, PDN-GW), network control/signaling functions (e.g. IMS control functions, packet forwarding, path computation), and protocol implementations (OSPF, BGP, IPv4, IPv6).

The client context data may be directly obtained from the resource allocation request, e.g. by getting the client identification data from the resource allocation request. The client context data may be a derivation of information in the client context data. Information from the resource allocation request may me enriched with other data, which enriched data then is the obtained context data. Information from the resource allocation request may used to find data related to that information, which related data then is the obtained context data.

Placement of a network node function in a network node typically includes allocating of hardware resources in the network node and loading the network node function on the allocated hardware resources, hereby enabling the network node function to be executed and used. It is possible that the network node function is already present on the second network node, in which case the network node function may be enabled by activating the network node function.

A network node may provide facilities, e.g. a hypervisor, to virtualize resources. Multiple network nodes may be organized in a cloud network or cloud service provider that provides access to a pool of resources. A network node function may then be implemented as part of a virtual machine (or other abstractions offered to access virtualized resources, e.g. virtualized switch, router) or multiple network node functions may be combined into a single virtual machine.

The Internet gateway is e.g. a (home) router, PDN-GW or H(e)NodeB.

A cloud service provider may e.g. be selected based on client, server, and/or network requirements (e.g. the geographical location of a client device, network cost and performance to a cloud provider location and/or policies).

An entity is a network node or a software module running on a network node that is capable of communication with other entities using a communication protocol. The resource provider entity is an entity that is configured to process resource allocation request and use information about the client device provided with the resource allocation request, such as the client identification data, to obtain client context data. The client context data is then used by the resource provider entity to determine which network node should be used for offering the network node function to the client device. The thus selected network node is the second network node. The resource provider entity transmits a function placement request to the second network node for having hardware resources allocated at the second network node and loading the network node function, after which the network node function is enabled and ready for use. It is possible that the network node function is already loaded in the second network node, in which case the resource allocation and loading of the network node function may be skipped and the network node function may be activated instead.

In an embodiment the method can further comprise transmitting a response data from the resource provider entity to the client device via the intermediary of the first network node. The method can further comprise redirecting further request data for using the network node function from the client device to the second network node based on the response data.

To enable request data from the client device for using the network node function to be redirected to the second network node, the resource provider entity may transmit response data to the client device via the intermediary of the first network node. The response data includes e.g. a reference to the second network node. The response data may be used by the client device or by e.g. a gateway in between the client device and the first network node to redirect the request data to the second network node. As a result the network node function may now be used at the second network node instead of the first network node.

In an embodiment the enabling of the network node function in the second network node can comprise downloading a network node function data to the second network node, wherein the network node function data comprises computer program code defining the network node function.

This enables the second network node to download the network node function data, e.g. in the form of a data image of the network node function, in case the network node function is e.g. not available in the second network node.

The network node function data may be downloaded from any data source.

In an embodiment the client device can be communicatively connected to the first network node via the intermediary of a first gateway entity, wherein the response data comprises a reference to the second network node, and wherein the redirecting is performed in the first gateway entity based on the response data.

This enables the redirection of further request data to be handled by the first gateway entity without having to reconfigure the client device. The redirection is then transparent to the client device.

In an embodiment the first gateway entity can be one of: a gateway entity in the client device, a router communicatively connected to the client device, a base station in a mobile network that is wirelessly connected to the client device, a packet data network gateway in a mobile network that is communicatively connected to the client device or a residential gateway that is communicatively connected to the client device.

This enables the first gateway functionality to be implemented at different entities in the network. The gateway entity may be implemented in software, e.g. as a communication module in the client device.

In an embodiment the client device is communicatively connected to the first network node via the intermediary of a first gateway entity. The method can further comprise determining in the resource provider entity a second gateway entity different from the first gateway entity to be used by the client device as an intermediary for accessing the network node function in the second network node. The service response data can comprise a reference to the second gateway entity. The redirecting can comprise setting up a connection from the client device to the second network node via the intermediary of the second gateway entity based on the response data.

The client device can thus be instructed to connect to the second gateway entity. This enables the redirection of further request data to be handled by the second gateway entity.

In an embodiment the second gateway entity is one of: a gateway entity in the client device, a router communicatively connected to the client device, a base station in a mobile network that is wirelessly communicatively connected to the client device, a packet data network gateway in a mobile network that is communicatively connected to the client device or a residential gateway that is communicatively connected to the client device.

This enables the second gateway functionality to be implemented at different entities in the network. The gateway entity may be implemented in software, e.g. as a communication module in the client device.

In an embodiment the determining in the first network node of the resource provider entity can comprise resolving a reference to the resource provider entity based on the client identification data by transmitting at least a part of the client identification data to a lookup database and in response receiving the reference to the resource provider entity from the lookup database.

This enables finding the relevant resource provider entity in case there are multiple resource provider entities.

In an embodiment the at least part of the client identification data can comprise an IP address of the client device. The lookup database can be one of a whois database, a geoIP database or a database linking IP address ranges to resource provider entities.

This enables resolving the resource provider entity using various lookup databases.

In an embodiment the resource allocation request can further comprise one or more resource requirements. The determining in the resource provider of the second network node can be further based on the one or more resource requirements.

In an embodiment the resource allocation request can further comprise one or more resource requirements. The resource provider entity can be configured to determine the second network node further based on the one or more resource requirements.

This enables taking into account various resource requirements, such as a maximum price, a minimum bandwidth, a maximum latency or a maximum jitter, when choosing the resource provider entity.

In an embodiment the method can further comprise determining in the resource provider entity a third network node based on the client context data and a prediction of a future use of the network node function in the third network node based on a geographical motion of the client device. The method can further comprise transmitting a further function placement request from the resource provider entity to the third network node. The further network placement request can comprise the indication of the network node function. The method can further comprise enabling the network node function in the third network node based on the further function placement request.

In an embodiment the resource provider entity can be further configured to determine a third network node based on the client context data and a prediction of a future use of the network node function in the third network node based on a geographical motion of the client device. The resource provider entity can be further configured to transmit a further function placement request to the third network node for enabling the network node function in the third server based on the further function placement request. The further function placement request can comprise the indication of the network node function.

The resource provider entity can thus determine a third network node based on the client context data and a prediction of a future use of the network node function from the second network node to the third network node, e.g. based on a geographical movement of the client device, and pre-allocate and pre-load the network node function at the third network node.

In an embodiment the transmitting of the resource allocation request from the first network node to the resource provider entity can be triggered by a network device different from the client device.

In an embodiment the second network node can be a cloud service.

In an embodiment the method can further comprise charging in the resource provider entity a use of the network node function.

In an embodiment the resource provider entity can be further configured to charge a use of the network node function.

This enables e.g. billing of the use of the network node function in the second network node.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

A solution is proposed that enables placement and use of a network node function in a second network node instead of using the network node function in a first network node. The second network node is typically selected for desirable operational parameters (e.g. latency, bandwidth, hops, affinity, data processing capacity, storage) in relation to the client device or to the network of an operator servicing the client device, which are better than the operational parameters in the first network node. Client requests transmitted to the first network node may be redirected to the second network node.

The client device may be any end-user device, such as a PC, notebook, tablet or smartphone, or a network node other than the first network node and the second network node.

Examples of a network node are a server and a router. Examples of network node functions are server functions and router functions. A server function is e.g. a web server providing an application service, a HTTP proxy or a DHCP server. Examples of router functions are path computation (parts of a routing protocol), packet filters, firewalls and packet forwarding.

Placement of a network node function in a network node typically includes allocating of hardware resources in the network node and loading the network node function on the allocated hardware resources, hereby enabling the network node function to be executed and used. It is possible that the network node function is already present on the second network node, in which case the network node function may be activated.

The second network node may provide facilities, e.g. a hypervisor, to host a virtual machine organized in a cloud network or cloud service provider. A network node function may then be implemented as part of a virtual machine or multiple network node functions may be combined into a single virtual machine.

The Internet gateway is e.g. a (home) router, PDN-GW or H(e)NodeB.

A cloud service provider may e.g. be selected based on client, server, and/or network requirements (e.g. the geographical location of a client device, network cost and performance to a cloud provider location and/or policies).

In the following examples the network nodes are related to servers and network node function are related to server functions. The examples are similarly applicable to other types of network nodes and network node functions, such as routers and router functions. Where in the following examples the network nodes are cloud locations and servers are virtual machines (VM) running at the cloud locations, it is to be understood that the invention is not limited to cloud computing. The network nodes may be servers of any kind and the network node functions may be server functions of any kind.

Figure 1:
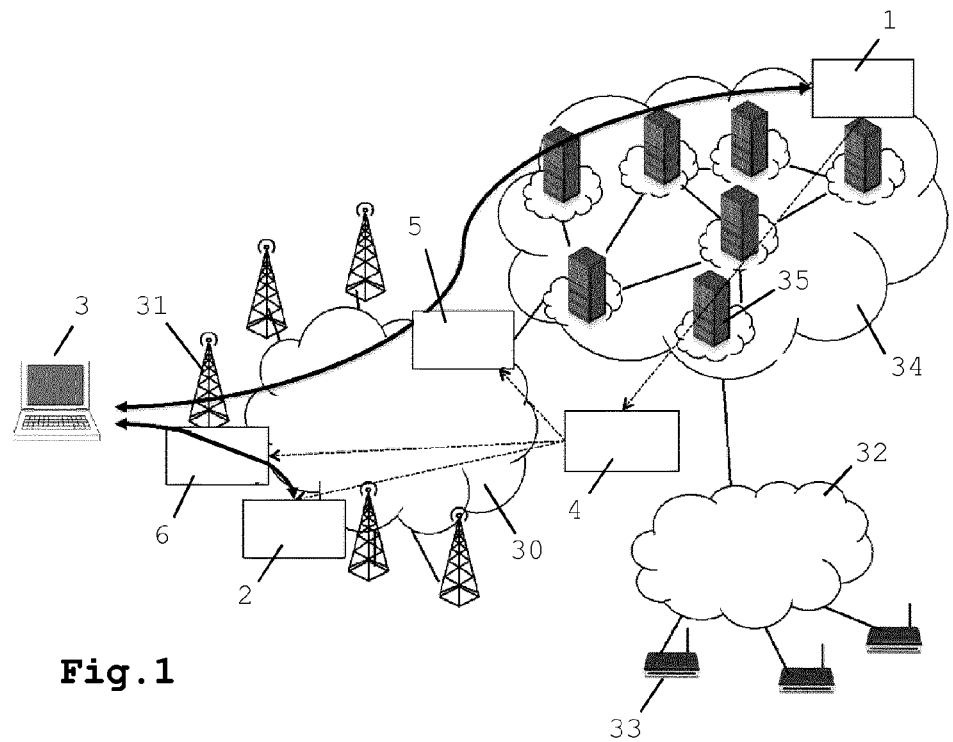
FIG. 1 is an exemplary embodiment of a network architecture for enabling a network node function on a second network node.

FIG. 1 shows an exemplary embodiment of a network architecture. A client device 3 is communicatively connected to a first server 1, as indicated by the arrow between the client device 3 and the server 1. The client device 3 may be a mobile device that is connected to a first Internet gateway 5 at the edge of a mobile network 30 via a base station 31. The server 1 may be one of a multitude of cloud servers 35 in a cloud network 34.

The client 3 may send a request to the server 1. The server 1 may be addressed in any known manner, e.g. by using an indirect reference such as an URL that is translated into a network address such as an IP address using a domain name service (DNS) or by using the network address of the server directly. The client request may pass through an Internet Gateway 5 of the network service provider before reaching the server 1. When a server 1 receives the client request, it may determine (e.g. using historical data, the type of request or by applying active or passive network measurements) if the requested service can be optimized by offloading part or all of the server functions to a second server 2 at another location. The server 1 may send a resource request to a resource provider entity 4 to localize a cloud service provider to create a VM (e.g. a copy or specific functionality of the server 1) that optimizes the performance and end-user experience of the client 3, e.g. by placing those server functions in the VM 2 that require a high bandwidth and low latency network connection.

The client may be a device having a wired connection to the server 1. The client device is then e.g. connected to a broadband network 32 via the intermediary of a router or home router 33, via which a connection to the server 1 may be made.

Figure 2:
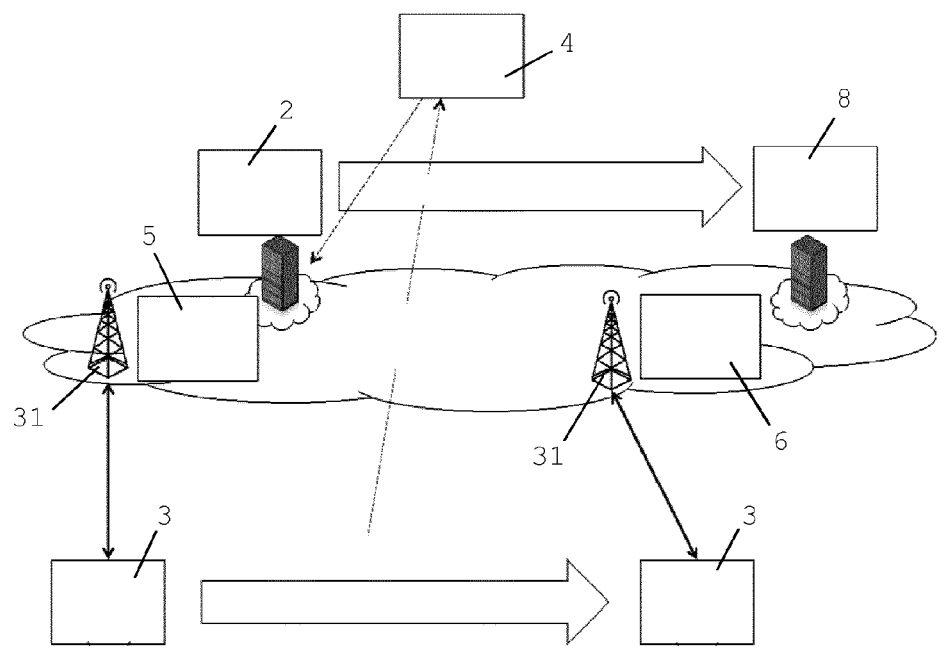
FIG. 2 is an exemplary embodiment of a network architecture applying a pre-allocating of a network node function from a second network node to a third network node.

With reference to the exemplary embodiment shown in FIG. 2, the first server 1 may request the resource provider service 4 to pre-allocate resources on a third server 8 or to automatically allocate server functions when the network triggers an event (e.g. in the case of a hand-over or congestion). In the example of FIG. 2 a client device 3 is communicatively connected to a second server 2 via the intermediary of a base station 31 and a first Internet gateway 5. In this example, the client device 3 moves into the coverage area of another base station 31, as depicted by the block arrow in between the left client device 3 (i.e. the client device 3 at a first geographical location) and the right client device 3 (i.e. the client device 3 at a second geographical location). This may trigger a hand-over network event, which is received in the resource provider 4 as depicted by the arrow towards the resource provider 4. The resource provider 4 may inform the second server 2 to allocate the server function, e.g. transfer its state and data, for the client device 3 to a third server 8, as depicted by the arrow from the resource provider 4 to the second server 2. The transfer of the state and data is indicated by the block arrow in between the second 2 and the third server 8.

The hand-over network event may be detected by a node in the mobile network, such as a home subscriber server (HSS) that listens to network events. The HSS may initiate re-allocation automatically ensuring that the server functions at the network nodes 2,8 are continuously located in the most optimal location for the end-user without explicit resource requests from the client device 3.

In case the client device 3 is a mobile communication device such as a GPRS, UMTS or LTE mobile device, the client device 3 is typically configured to have a data connection via the intermediary of a PDN-GW or Internet gateway 5,6. Data traffic is then tunneled from the client device 3 to the Internet gateway 5,6. Optimally, servers 2,8 are placed at the Internet gateway 5,6. 3GPP standards recommend that the Internet gateway 5,6 providing IP connectivity to a client device 3 is chosen geographically near the client device 3 using known DNS methods to resolve the IP address of the Internet gateway 5,6. It may therefore be assumed that Internet gateways 5,6 are located geographically near a client device 3.

FIGS. 3-8 show time-sequence diagrams of exemplary embodiments of the invention. Transfers of data between elements are depicted by the arrows. References in between brackets indicate contents of data being transferred. The black dots depict an action performed at an element. Dashed vertical lines, such as shown in FIGS. 5-8, depict that one or more steps are not shown for the sake of simplicity.

Figure 3:
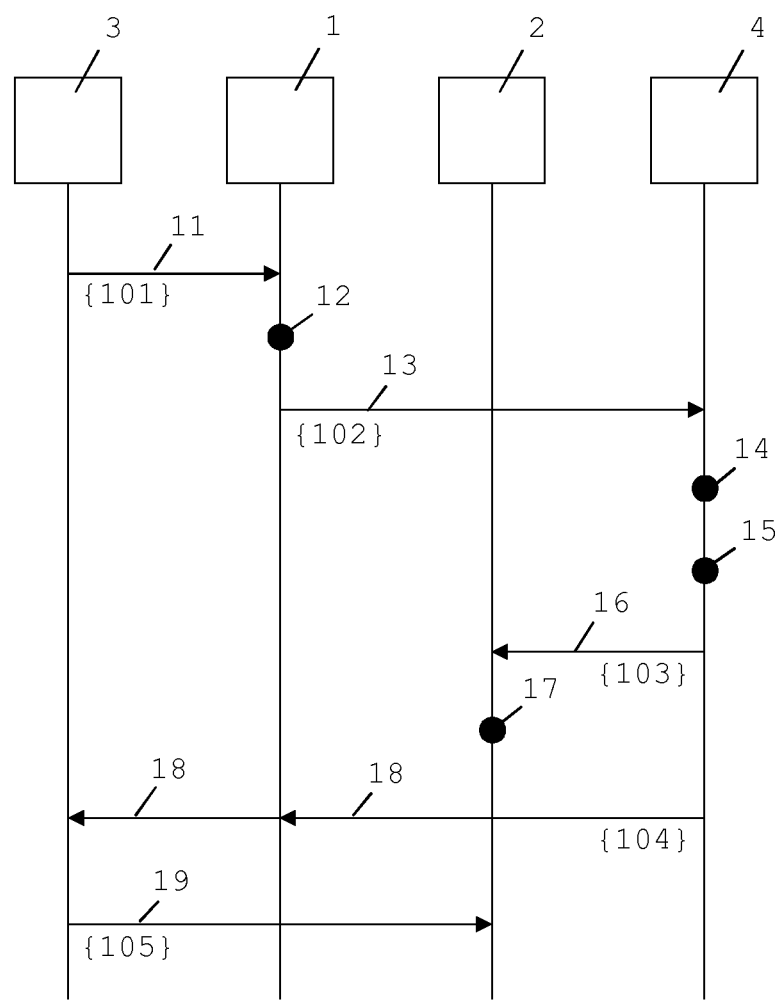
FIGS. 3-8 are time-sequence diagrams of exemplary embodiments of the invention.

In FIG. 3 an example is shown of enabling a server function on a second server 2, e.g. on a cloud location in a mobile network. A program running on the client device 3 may start a session or sends request data 101 to a first server 1. Depending on the client service request method, e.g. using HTTP, FTP, SSH, SMTP, SIP, or using any other protocol, the request data 101 comprising client identification data is received 11 from the client device 3 in the server 1, typically transparent from the user of the client device 3. The server 1 may use the IPv4 address, IPv6 address, host name or any other identification from the client identification data to determine 12 a service access point (e.g. in the form of an URL) of a resource provider entity 4 responsible for the client 3.

Figure 7:
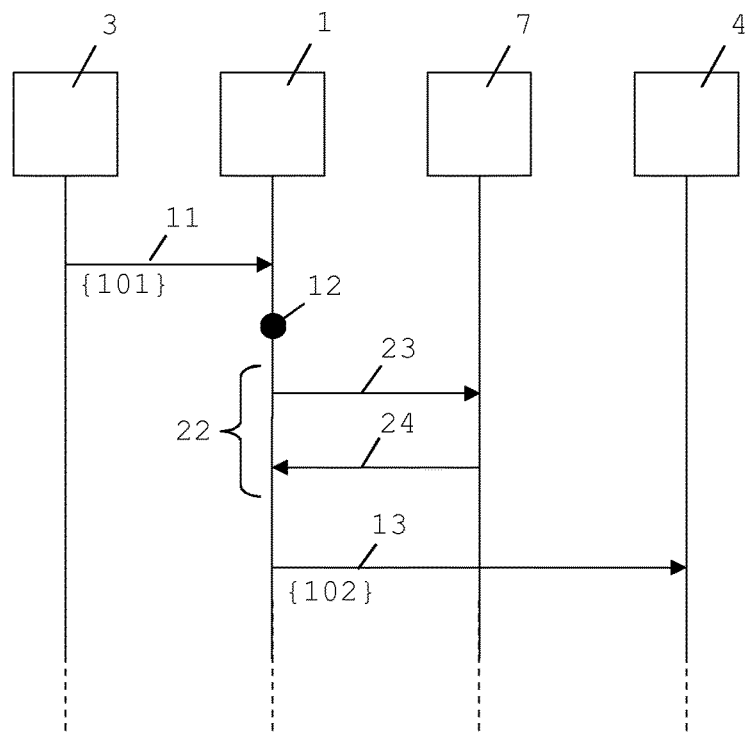

The determining 12 of the service access point of the resource provider entity 4 may be based on resolving 22 a reference to the resource provider entity 4 using a lookup database 7, such as shown in FIG. 7. The lookup database 7 is e.g. a whois database, a geoIP database or a database linking IP address ranges to resource provider entities 4. The server 1 may execute a whois request 23 to a whois database and receive a response 24 to construct a reference to an interface of the resource provider 4 associated with the IP address space of the client device 3. The resource provider 4 may alternatively or additionally be resolved using a geoIP database to match the IP address of the client device 3 to a geographically nearest resource provider location. In this case the geoIP database typically contains the geographic location of the IP address and of the resource provider's service access point. The server 1 may receive 24 a list of IP address to resource provider mappings in response to the lookup request 23.

The request data 101 typically includes an indication of a function that is being requested in the server 1, e.g. in the form of a service request. Additional user or device specific properties may be included in the request data 101, which the server 1 may use in the determination 12 of the resource provider entity 4 and/or for generating a resource allocation request 102. Examples of such properties are a GPS location of the client device, credentials and service level agreement information. The client 3 and server 1 may additionally or alternatively use a protocol to supply the server with the properties. An example of such protocol is the server 1 requesting access to a GPS device of client 3 for receiving a geographical location of the client device 3. Another example is the server explicitly requesting a subscriber identity.

The server generates a resource allocation request 102, which contains data relevant for the resource provider 4 to determining the second server 2 where the server function is to be loaded. The resource allocation request 102 typically contains the client IP address or any other client identification data and an indication of the requested server function. Optionally the resource allocation request 102 contains the client specific properties. Together with the indication of the requested server function, resource requirements for running the server function and/or a URL referencing server function data to load and run the server function may be provided.

The server 1 transmits 13 the resource allocation request 102 to the resource provider entity 4.

Using the information provided in the resource allocation request 102, the resource provider entity 4 obtains 14 client context data. Hereto the resource provider entity 4 may use the client IP address to query the home network of the client device 3 for e.g. a subscriber identity. If available, the resource provider 4 may use additional parameters in the resource allocation request 102 to determine the context of the client device in the network, e.g. the GPS coordinates or originating IP address in an X-Forwarded-For field provided by the client 3. Network service providers are typically capable of matching an IP address from their IP space to the subscriber identity that is currently using it. Once the subscriber identity is known, the network service provider can construct the context of the client device in the network (e.g. geographical location, Internet gateway, network services, policies, and permissions). Neither the client device 3, server 1 nor resource provider 4 requires topological knowledge of the network. In case the client device 3 is e.g. behind a network address translation device of the network service provider's network and only the public IP address is given, it is assumed that the network service provider is capable of determining the subscriber identity from e.g. the 5-tuple (source IP, destination IP, source Port, destination Port, Protocol ID). This because a NAT typically maintains the mapping between the public address and port and private address and port to provide connectivity.

The thus obtained client context data is used by the resource provider entity 4 to determine 15 the second server 2 where the server function is to be loaded. For example from the resource requirements, client-specific properties from the resource allocation request 102 and a pre-stored list of cloud locations and their properties, the resource provider 4 selects a cloud location 2.

The second server 2 or cloud location 2 may be directly attached to an Internet gateway 6, attached through a local area network or attached through another network 32 such as wide area network or the Internet. If attached to an Internet gateway 6, the interface of the cloud location 2 may be constructed from the identifier of the Internet gateway 6, e.g. by maintaining a list of Internet gateways DNS names and IP addresses associated with a cloud location. If attached through a local area network or another network 32, a cloud location 2 may be selection on other parameters, such as geographical distance, bandwidth, and quality of service to the Internet gateway.

The resource provider entity 4 may determines 15 the best matching cloud location 2 and optionally the associated Internet gateway 6 using a default rule-set or on basis of a rule-set given in the resource allocation request 102 and a list with cloud location properties maintained by the network service provider. In a simple case, when no additional parameters such as client-specific resource requirements are given, the resource provider 4 chooses the cloud location 2 directly associated with the current Internet gateway 5 of the client device 3 (e.g. retrieved from the HSS). The default cloud location selection may include a geographical distance of a cloud location 2 to the client device 3 or its Internet gateway 5,6, latency, jitter, and other properties (e.g. security levels associated with the subscriber, or geographical boundaries), which may lead to selection of a different Internet gateway 6 or cloud location 2 in the Internet or in the network service provider's network. Amongst other properties, the list of properties associated with the cloud location may include pricing, i.e. cost of using a server function at a specific location, and active or passive measurements associated with the location (e.g. bandwidth, latency or jitter to a specified IP destination).

The following table is an example of a list of properties associated with cloud locations. The cloud location in this example is given as a URL. The costs of hosting a service at a cloud location are given in the column "price". The geographical location of a PDN-GW to which the cloud location is connected is given in latitude/longitude geographical coordinated. The identity of the PDN-GW, which may be used for addressing the PDN-GW is also given. The last three columns give bandwidth, latency and jitter information associated with the cloud location.

| Cloud location | Price | Geo location of PDN-GW | PDN-GW identity | Bandwidth | Latency | Jitter |
| --- | --- | --- | --- | --- | --- | --- |
| http://cloudlocation1.net | 1 | 52.370216/ 4.895168 | 1 | 100 Mbit | 10 ms | 15 ms |
| http://cloudlocation2.net | 10 | 52.270216/ 4.895168 | 2 | 1 Gbit | 5 ms | 123 ms |
| http://cloudlocation3.net | 2 | 52.367459/ 4.90178 | 3 | 50 Mbit | 70 ms | 11 ms |

If the resource allocation request 102 contains a rule, for example that the price may not exceed 1, the first row in the properties table shown above will be chosen resulting in the selection of the cloud location http://cloudlocation1.net.

The determination 15 of the cloud location 2 typically results in a reference (e.g. a URI or URL) to the interface of the cloud location 2 (e.g. using REST) and optionally of an Internet gateway 5,6.

Optimizations of finding the cloud locations are possible. For example, the subscriber identity may be associated with a pre-defined number of cloud locations or Internet gateways may be assigned to default cloud locations. The subscriber identity may be associated with a set of default cloud location on the basis of location statistics or policies (e.g. user is at office or user is at home). Consequently, cloud selection may be simplified to a lookup in the HSS.

The resource provider entity 4 may send a response data 104 to the first server 1 to acknowledge that a second server 2 has been found. When the resulting cloud location is reachable through an Internet gateway 6 other than the Internet gateway 5 the client is currently using, the resource provider entity 4 may add information (e.g. the new APN to connect to) in the response data 104 to the server 1, which on its turn may transmit the response data 104 to client device 3 (e.g. embedded in a HTTP response header). The client device may use the additional information in the response data 104 to request the network for access to the other Internet gateway 6. For example, when an HTTP response contains the APN identifying a (new) target PDN-GW 6, the client 3 may send an attach request to the network using existing mechanisms in telecom networks.

Once the cloud location and optionally the Internet gateway to which the cloud location 2 is connected are determined, the resource provider entity 4 may send 16 a function placement request 103 to the selected cloud location 2 (or other second server 2) with parameters from the resource allocation request 102.

Figure 4:
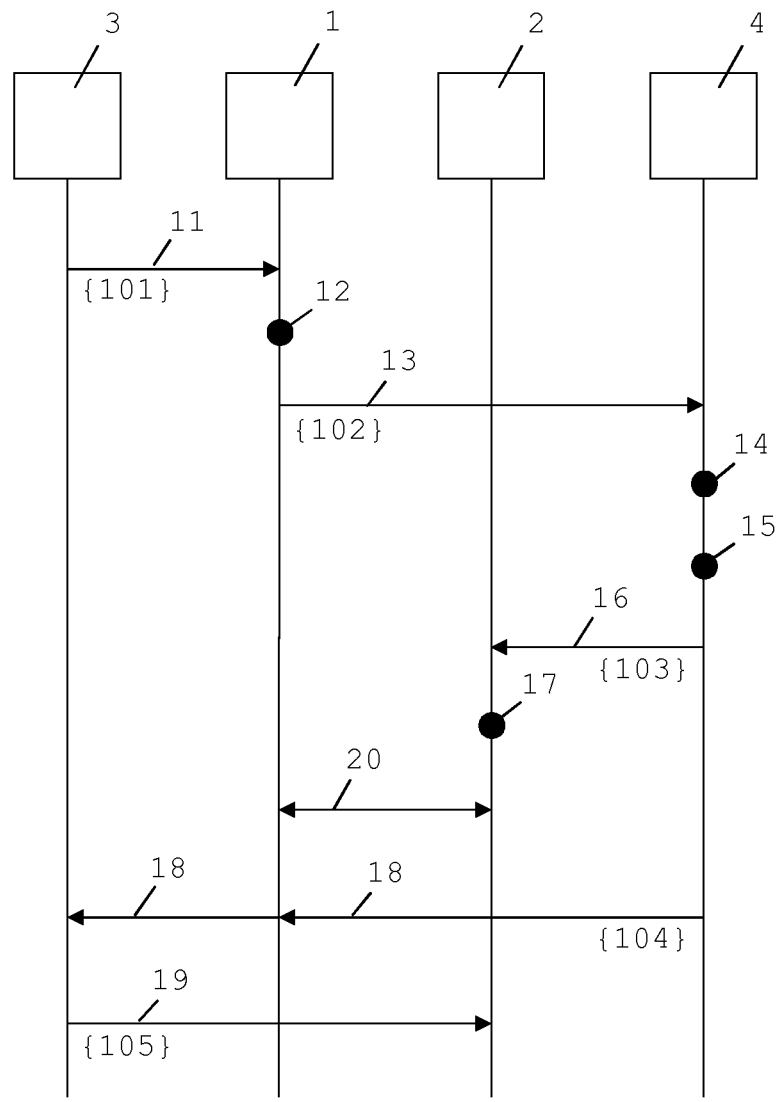

The cloud location 2 loads 17 the server function, e.g. onto a virtual machine, based on the function placement request 103. Server function data (or more generally network node function data), e.g. in the form of a data image of the server function, may be downloaded from any data source before loading. For example, if the Server function data is not present in the cloud location 2, the cloud location 2 may download 20 the server function data e.g. referenced by an optional URL in the resource allocation request 102, as shown in FIG. 4. In the example of FIG. 4 the server function data is downloaded from the second server 2, but it may be downloaded from any other source. The server function data is e.g. a file formatted in open virtualization format (OVF) containing a disk image, other resources and a description of the virtual system. The OVF package may be used to run a virtual machine on a hypervisor (e.g. KVM, VMware) at the cloud location 2 with the specified resource requirements (e.g. amount of memory, disk size, and number of CPUs) from the function placement request 103. The data reference by the URL in the resource allocation request 102 may be cached or kept available in a centralized repository or distributed over the network service provider's network. In case of roaming or handover, for example, distributing the data over multiple locations may reduce the amount of data that has to be transferred between two locations (e.g. only synchronize VM state with a locally available copy).

The second server 2 or cloud location 2 may assign an IP address or any other address reachable by the client device 3 to the server running the server function through DHCP or other mechanisms in the network. The IP address of the second server may be located behind a firewall. In that case, the second server 2 typically initiates the communication with the first server 1. When e.g. a virtual machine is used for providing the server function, a cloud location 2 may return a string or a URL referencing a string with information about the VM (e.g. IP address, username, password, certificate, cryptographic hash, URL to monitor resources, REST interface to control the VM).

As a result of the allocation, the resource provider entity 4 may initiate charging and/or billing of the use of the server function at the second server 2, such as at a specific cloud location. Billing may be to an owner of the server 1 that initiated the use of the server function on the second server 2, may be to the owner of the client device 3 or may be shared between the owner of the server 1 and the owner of the client device 3. Hereto, a list of IP addresses may be maintained (e.g. at the resource provider 4 or part of the HSS) that associates the server function at the second server 2 with the owner of the first server 1 or client device 3 and its subscriber identity.

Once the server function is enabled in the second server 2 and its properties (e.g. IP address) are known, the resource provider 4 may provision the client device 3 or the Internet gateway 5,6 (e.g. Home router, residential gateway, PDN gateway, H(e)NodeB) associated with the second server 2. Provisioning of the Internet gateway 5,6 may involve packet filtering, network address translation, and possibly name resolving or application layer gateway services for redirection. The resource provider 4 may use information about the second server 2 to resolve IP addresses that are to be redirected (e.g. if a host name of the second server 2 was given in the resource request) from host names, packet filtering rules, network address translation mappings, and application-layer gateway rules that result in the redirection 19 of client requests 105 to the second server 2.

Further client requests 105 may be redirected to the second server 2 by the client device 3 or by the Internet gateway 5,6. Hereto the Internet gateway 5,6 or the client device 3 is configured using the response data 104.

Once the server function is running in the second server 2 and the client requests 105 are redirected to the second server 2, the server function at the second server 2 may be stopped explicitly or by a trigger. Stopping the server function may be triggered by the first server 1 (e.g. using an expiration timer that allows the VM to shutdown itself), by the resource provider 4 (e.g. when a predefined maximum financial budget is reached), or by an explicit client 3 request (e.g. by sending a DELETE query to the resource provider 4). When e.g. a VM at a cloud location 2 receives a request to stop, it notifies the resource provider 4, which cleans up any state associated with the VM, such as any configured redirections at the associated Internet gateway 5,6 or at the client device 3.

Figure 5:
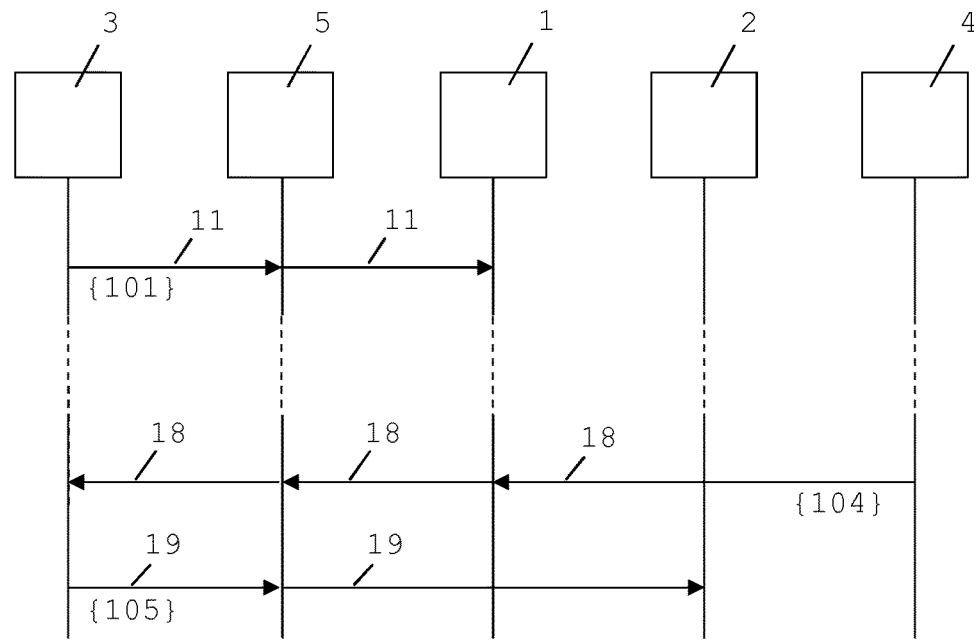

FIG. 5 shows an example of how a first Internet gateway 5 may be involved in the message flows between the client device 3 and the first server 1, between the client device 3 and the second server 2 or cloud location 2 and between the client device 3 and the resource provider entity 4. The message flows 11,18,19 are similar to those shown in FIG. 3, but now go via the first Internet gateway as indicated.

Figure 6:
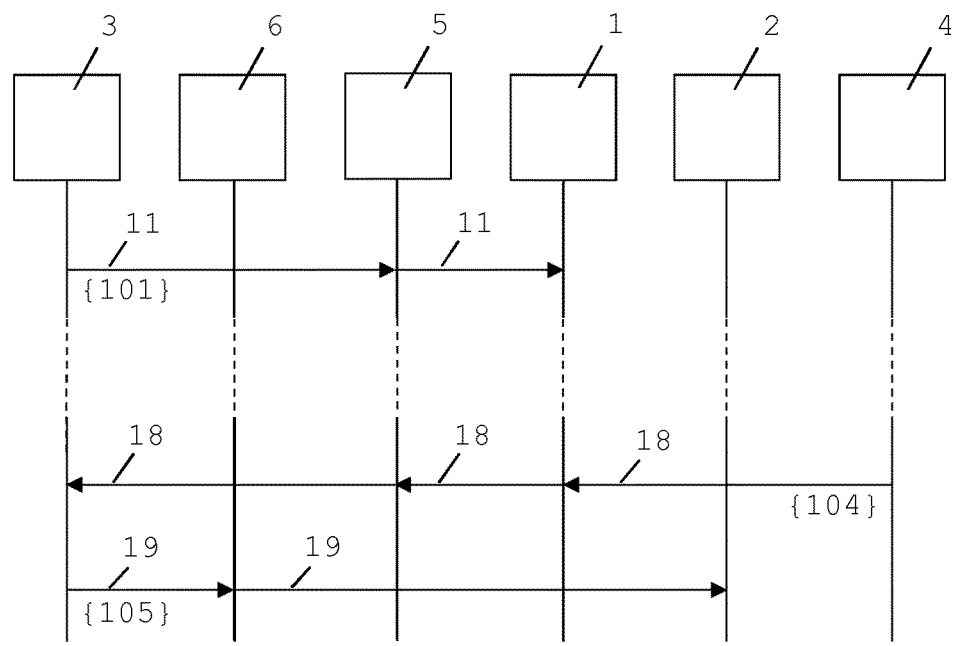

FIG. 6 shows an example of how a first Internet gateway 5 and a second Internet gateway 6 may be involved in the message flows between the client device 3 and the first server 1, between the client device 3 and the second server 2 or cloud location 2 and between the client device 3 and the resource provider entity 4. The message flows 11,18,19 are similar to those shown in FIG. 3, but now go via the first Internet gateway 5 and second Internet gateway as indicated.

Figure 8:
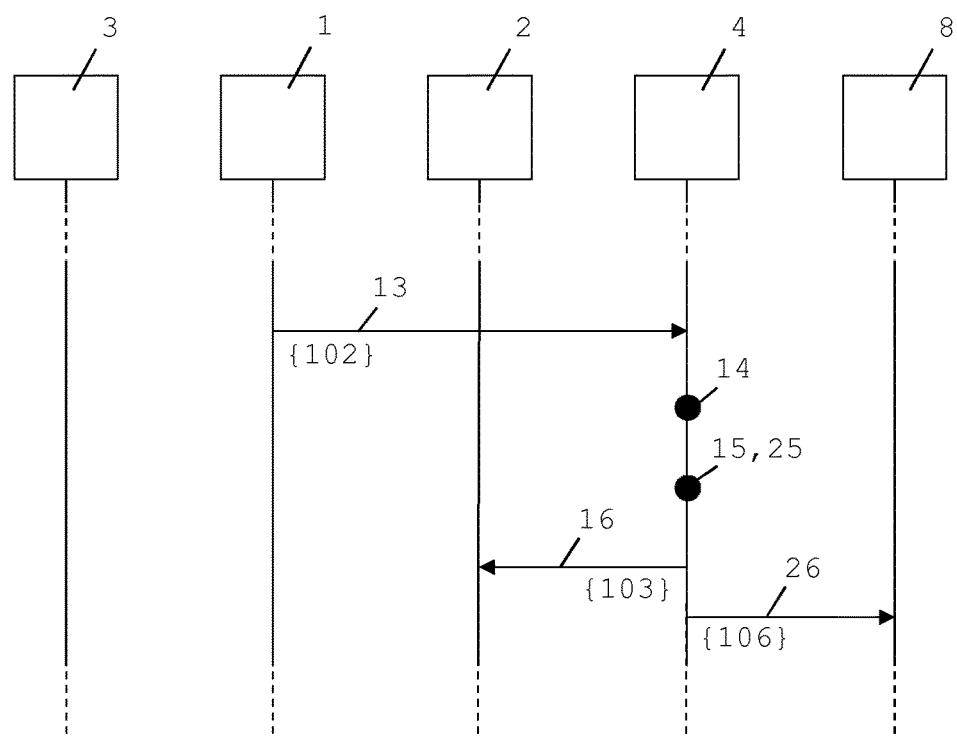

Because the first server 1 knows the resource provider 4, advanced operations are possible. The first server 1 may e.g. request the server function to be available at multiple servers 2,8 (e.g. based on an expected trajectory) instead of one server, such as shown in the example of FIG. 8. Similar to the example of FIG. 3, in FIG. 8 the resource provider entity 4 determines 15 a second server 2 based on the client context data. Furthermore the resource provider entity 4 determines 25 a third server 8 based on the client context data and a prediction of a future use of the server function in the third server 8, e.g. based on a geographical movement of the client device 3. Besides the function placement request 103 a further function placement request 106 may be transmitted 26 to the third server 8 for enabling the server function in the third server 8. The enablement of the server function at multiple servers 2,8 may be used to speed up server allocation, for example.

In case of roaming, the IP address of the client device 3 may be associated with the home network of the client device 3 because the client device 3 either has no access to a local Internet gateway in the visiting network or it was attached to the home network before moving to the other network. Consequently, the location of the second server 2 may be geographically near the Internet gateway 5 in the home network, but geographically far away from the client device 3. When the visiting network provides access to a local Internet gateway 6, the HSS may be updated with the information of this change and an IMS application listening to HSS updates of the subscriber identity may trigger the resource provider 4 to load or move a server function to a second server 2 or cloud location 2 in the visiting network.

The resource provider entity 4, if the server requests so, may dynamically move the server function at a second server 2 to a new location triggered by any network event, such as a handover or an indication of network congestion. In case of a handover for example, an IMS application may be made that listens to HSS events associated with the subscriber identity. On hand-over, the IMS application may send a new resource request to the resource provider 4 with the new location. Once the server function is enabled at the second server 2, the resource provider 4 may delete the server function from the first server 1 or keep it alive in case a handover to the old location is requested. The resource provider may choose to create a redirection from the second server 2 to the first server 1. This allows the server function to stay available at the first server 1 while the server function is not yet available at the second server 2. It is possible that both the home and visiting network share caching and distribution of servers (e.g. a content distribution network) to speed up state and data transfer.

The invention may be applied recursively to multiple domains. When a resource provider 4 for example requests a cloud location 2 for a VM, it may on its turn request a resource provider in its domain to select a cloud location and internet gateway best matching the given requirements.

The second server 2 may send the resource allocation requests 102. The resource provider entity 4 may then initiate the enabling of the server function at another server on behalf of the subscriber identity (possibly using its associated permissions and policies) that is retrieved from a list of server associations.

One embodiment of the invention may be implemented as a program product for use with a computer system. The program(s) of the program product define functions of the embodiments (including the methods described herein) and can be contained on a variety of non-transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The invention claimed is:

1. A method for enabling a network node function on a second network node, wherein the network node function is provided to a client device that is communicatively connected via a network service provider's network to a first network node, the method comprising:
   receiving a request data from the client device in the first network node for requesting the network node function, the request data comprising a client identification data and an indication of the network node function in the first network node;
   determining in the first network node a resource provider entity based on the client identification data;
   transmitting a resource allocation request from the first network node to the resource provider entity, the resource allocation request comprising the client identification data and the indication of the network node function;
   obtaining a client context data in the resource provider entity based on the resource allocation request wherein the client context data comprises a context of the client device in the network service provider's network;

determining in the resource provider entity the second network node based on the client context data;

transmitting a function placement request from the resource provider entity to the second network node, the function placement request comprising the indication of the network node function; and enabling the network node function in the second network node based on the function placement request.

2. The method according to claim 1, further comprising:

transmitting a response data from the resource provider entity to the client device via the intermediary of the first network node; and redirecting further request data for using the network node function from the client device to the second network node based on the response data.

3. The method according to claim 1, wherein the enabling of the network node function in the second network node comprises downloading a network node function data to the second network node, wherein the network node function data comprises computer program code defining the network node function.

4. The method according to claim 1, wherein the client device is communicatively connected to the first network node via the intermediary of a first gateway entity, wherein the response data comprises a reference to the second network node, and wherein the redirecting is performed in the first gateway entity based on the response data.

5. The method according to claim 4, wherein the first gateway entity is one of: a gateway entity in the client device, a router communicatively connected to the client device, a base station in a mobile network that is wirelessly connected to the client device, a packet data network gateway in a mobile network that is communicatively connected to the client device or a residential gateway that is communicatively connected to the client device.

6. The method according to claim 1, wherein the client device is communicatively connected to the first network node via the intermediary of a first gateway entity, the method further comprising:

determining in the resource provider entity a second gateway entity different from the first gateway entity to be used by the client device as an intermediary for accessing the network node function in the second network node, wherein the response data comprises a reference to the second gateway entity, and wherein the redirecting comprises setting up a connection from the client device to the second network node via the intermediary of the second gateway entity based on the response data.

7. The method according to claim 6, wherein the second gateway entity is one of: a gateway entity in the client device, a router communicatively connected to the client device, a base station in a mobile network that is wirelessly communicatively connected to the client device, a packet data network gateway in a mobile network that is communicatively connected to the client device or a residential gateway that is communicatively connected to the client device.

8. The method according to claim 1, wherein the determining in the first network node of the resource provider entity comprises:

resolving a reference to the resource provider entity based on the client identification data by transmitting at least a part of the client identification data to a lookup database and in response receiving the reference to the resource provider entity from the lookup database.

9. The method according to claim 8, wherein the at least part of the client identification data comprises an IP address of the client device and wherein the lookup database is one of a whois database, a database linking IP addresses to geographically nearest resource provider locations or a database linking IP address ranges to resource provider entities.

10. The method according to claim 1, wherein the resource allocation request further comprises one or more resource requirements and wherein the determining in the resource provider entity of the second network node is further based on the one or more resource requirements.

11. The method according to claim 1, further comprising:

determining in the resource provider entity a third network node based on the client context data and a prediction of a future use of the network node function in the third network node based on a geographical motion of the client device;

transmitting a further function placement request from the resource provider entity to the third network node, the further function placement request comprising the indication of the network node function;

enabling the network node function in the third network node based on the further function placement request.

12. The method according to claim 1, wherein the transmitting of the resource allocation request from the first network node to the resource provider entity is triggered by a network device different from the client device.

13. The method according to claim 1, wherein the second network node is a cloud service.

14. The method according to claim 1, further comprising charging in the resource provider entity a use of the network node function in the second network node.

15. A resource provider entity for enabling a network node function on a second network node, wherein the network node function is accessible by a client device that is communicatively connected via a network service provider's network to a first network node, wherein the resource provider entity is configured to:

receive a resource allocation request from the first network node, the resource allocation request comprising a client identification data and an indication of the network node function in the first network node;

obtain client context data based on the resource allocation request, wherein the client context data comprises a context of the client device in the network service provider's network;

determine the second network node based on the client context data; and transmit a function placement request to the second network node for enabling the network node function in the second network node based on the function placement request, the function placement request comprising the indication of the network node function.

16. The resource provider entity according to claim 15, wherein the resource allocation request further comprises one or more resource requirements and wherein the resource provider entity is configured to determine the second network node further based on the one or more resource requirements.

17. The resource provider entity according to claim 15, further configured to:

determine a third network node based on the client context data and a prediction of a future use of the network node function in to the third network node based on a geographical motion of the client device; and transmit a further function placement request to the third network node for enabling the network node function in the third server based on the further function placement request, the further function placement request comprising the indication of the network node function.

18. The resource provider entity according to claim 15, further configured to charge a use of the network node function in the second network node.

* * * * *